Figure 1:
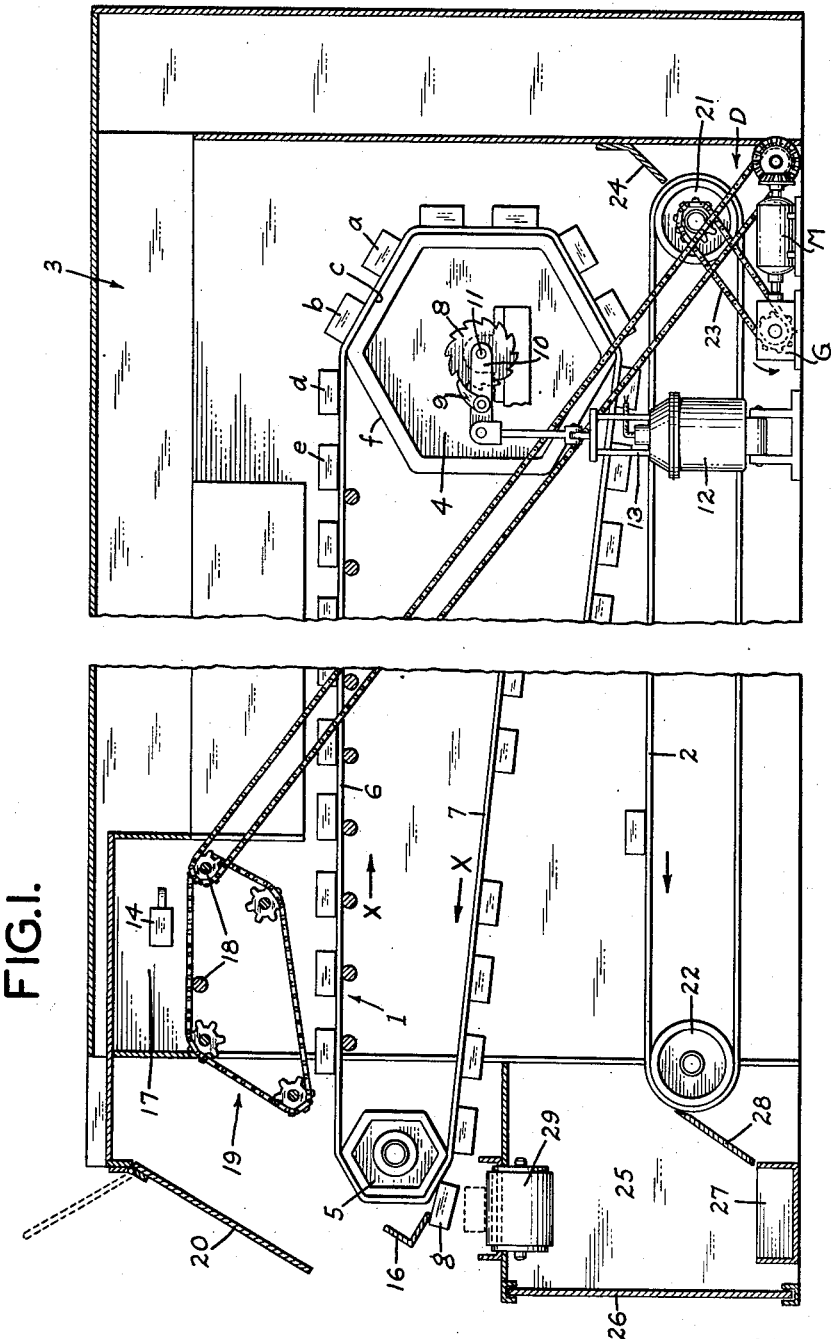

April 6, 1954

G. A. STONESTREET 2,674,100

CONVEYING OF PIECES OF MATERIAL
THROUGH A ZONE OF REFRIGERATION

Filed March 7, 1950

2 Sheets-Sheet 1

INVENTOR.
GEORGE A. STONESTREET
BY
HIS ATTORNEYS.

April 6, 1954     G. A. STONESTREET     2,674,100
CONVEYING OF PIECES OF MATERIAL
THROUGH A ZONE OF REFRIGERATION Filed March 7, 1950     2 Sheets-Sheet 2

INVENTOR.
GEORGE A. STONESTREET
BY
HIS ATTORNEYS.

Patented Apr. 6, 1954

2,674,100

UNITED STATES PATENT OFFICE 2,674,100

CONVEYING OF PIECES OF MATERIAL THROUGH A ZONE OF REFRIGERATION

George Alec Stonestreet, Richmond, England, assignor to T. Wall & Sons Limited, London, England, a company of Great Britain Application March 7, 1950, Serial No. 148,053

Claims priority, application Great Britain October 20, 1949

12 Claims. (Cl. 62—2)

This invention relates to refrigerating apparati and methods and particularly to methods and apparati for conveying pieces of plastic, congealable material, such as ice cream, margarine, butter, shortening and the like, through a zone of refrigeration to solidify and render the pieces form-retaining.

Pieces of material such as ice cream briquettes are subjected to refrigeration during the course of their manufacture. This refrigeration usually is carried out by depositing the pieces on a conveyor which travels through a refrigerating chamber. The pieces must remain in the chamber for a considerable period of time to solidify them. For example, in the manufacture of ice cream briquettes, the briquettes have to be refrigerated for between 15 and 20 minutes. This necessitates the use of either a single conveyor belt and a long refrigerating chamber or two or more conveyor belts moving in opposite directions in a shorter chamber. In the latter arrangement the pieces are passed horizontally through the chamber on one belt and at the end of their traverse of this belt, the pieces drop onto a second belt which conveys them back through the chamber in the opposite direction and so on. In the case of material such as ice cream briquettes and similar products, it is difficult to preserve the shape of the pieces for the reason that when they are dropped from the first belt to the second belt, they are dented or distorted.

Another difficulty arises if the pieces are deposited in rows across a first conveyor moving through a refrigerating chamber and then are transferred onto a second conveyor belt which conveys them back through the chamber in the opposite direction. The transfer of the rows of pieces from the one belt to the other, frequently destroys their orderly arrangement and the rows tend to pile up one on top of another during transfer. This disarrangement of the rows is particularly inconvenient when the pieces of material are to be transferred in single file onto a narrow belt moving at right angles to the second conveyor belt for wrapping and packing purposes. If the rows are in disorder on arrival at the discharge end of the second conveyor they will not drop onto the narrow belt in orderly succession but will require considerable handling to arrange them in single file.

An object of the present invention is to provide a method for conveying pieces of material through a zone of refrigeration in a relatively short chamber and which enables the pieces of material to be removed from the belt as pieces of well defined shape in substantially the same arrangement as that in which they were deposited on the belt.

Another object of the present invention is to provide apparatus for carrying out the above method.

The present invention provides a method of refrigerating pieces of plastic material which comprises conveying the pieces through the refrigerating zone on the outer surface of both the forward and return sides (upper and lower sides) of an endless conveyor belt.

To prevent the pieces from being dislodged from the conveyor, substantially unbroken contact must be maintained between the whole of the bearing surface of each piece of material and said belt surface whenever the conveyor belt changes its direction of movement, except at the discharge end of the conveyor. The pieces of material may be removed from the discharge end of the conveyor belt by changing the direction of movement of the conveyor belt in such a way as to break the contact between the bearing surface of the pieces and the conveyor belt.

The pieces of material may be deposited on the belt in single line or in parallel rows on a one or more conveyor belt transversely of the direction of movement of the conveyor belt or belts by the method and apparatuses mentioned above and described in U. S. application Serial No. 606,770, now Patent No. 2,488,344 November 15, 1949.

The invention also includes apparatus for practicing the method. This apparatus includes an endless conveyor belt having forward or upper and return or lower sides or flights which travel through a zone of refrigeration. The surface of the conveyor belt must be of such a character as to allow the material deposited on it in the form of pieces to freeze thereto during the passage of the upper side or flight of this belt through the zone of refrigeration thereby causing each piece of plastic material to adhere to the belt surface. It is desirable that the surface of the belt should also be such that any frozen material remaining on the belt surface after the pieces have been removed from the belt can readily be removed from the surface, for example by brushing the belt surface. The material should not form a permanent film on the belt surface and prevent freezing of other, subsequently deposited pieces to the belt. A belt of rubberized canvas has a surface which is particularly suitable for carrying out the invention.

Belts of "American cloth," or thin balata or of cotton webbing with a glazed plastic finish can also be used.

The inner or forward end of the conveyor moves around a supporting pulley of such shape as to maintain substantially unbroken contact between the inner surface of each piece and outer surface of the conveyor belt. Inasmuch as the conveyor does not flex relative to the contacting faces of the pieces, they are not broken loose or dislodged from the conveyor. As a result, the pieces cling to the conveyor in an inverted position on the lower flight of the conveyor.

The operating pulley over which the conveyor passes from the upper flight to the lower flight is of polygonal cross-section, this pulley being arranged to rotate intermittently after each row of the pieces of material is deposited so that the rows on the forward side of the conveyor overlie its flat sides. In a preferred embodiment, the operating pulley has an hexagonal cross-section and is arranged to receive two successively deposited pieces of material (or when the pieces of material are deposited on the belt in rows, two successively deposited rows of pieces) adjacent each of its flat sides.

The apparatus also is provided with means for breaking the contact between the opposed surfaces of the pieces and the conveyor belt to discharge the pieces as the belt moves upwardly from its return or lower flight to its forward or upper flight. The means for breaking loose the congealed pieces may consist of a discharge pulley of polygonal cross-section supporting the outer or feed end of the conveyor. This pulley is rotated so that the pieces of material on the return side of the conveyor overlie the corners between the flat faces of the pulley. Thus on rotation of the discharge pulley, pieces of material can only travel with the conveyor for a short distance around the pulley before the conveyor is bent away from the hardened pieces thereby breaking them loose from the conveyor.

In the preferred embodiment of the invention the discharge pulley is of hexagonal cross-section and is smaller than the operating pulley. It is so arranged with respect to the latter pulley that the upper side or flight of conveyor moves horizontally through the refrigerating chamber and the return or lower flight moves along a path inclined upwardly at a small angle to the horizontal. A stripper bar also assists in dislodging the pieces from the conveyor.

When ice cream briquettes are conveyed through the refrigerating zone of the apparatus, a few briquettes may fall from the return side of the conveyor if the extent of refrigeration is inadequate. To discharge these briquettes from the chamber, a subsidiary conveyor moving in the same direction as the return side of the main conveyor is located beneath this main conveyor to catch any briquettes that may fall.

Figure 2:
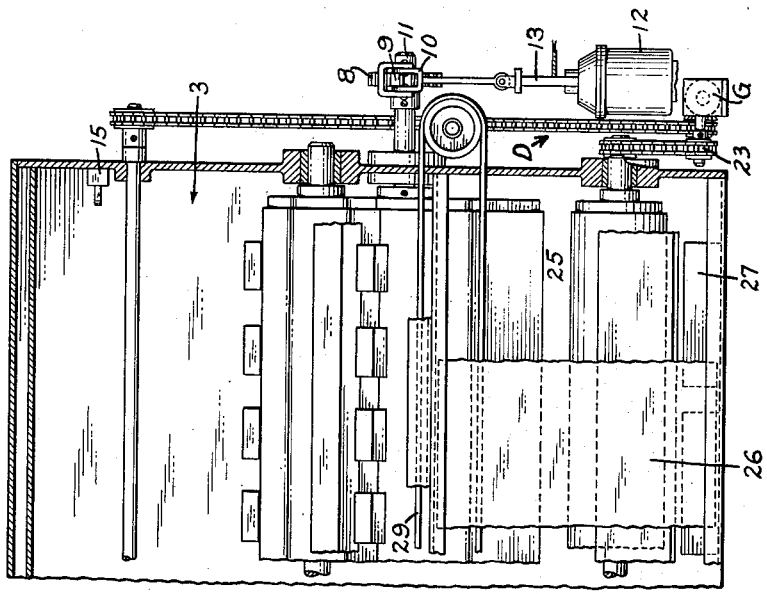
Figure 2:
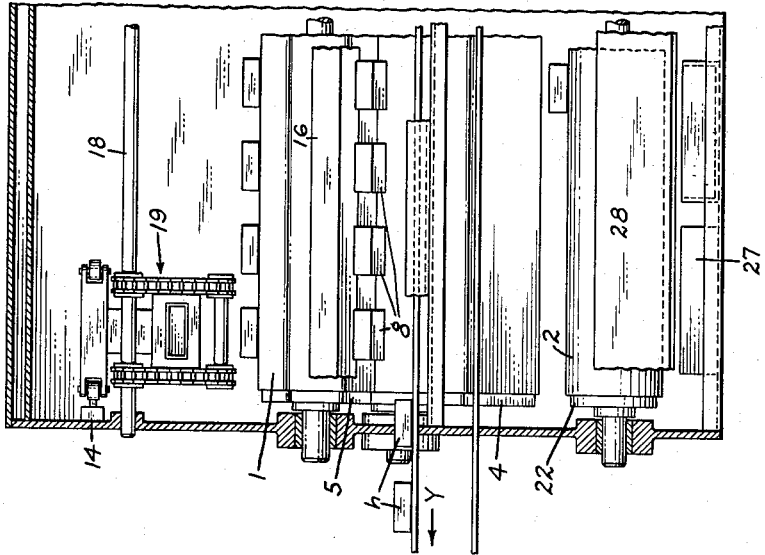

An embodiment of the invention suitable for conveying ice cream briquettes through a refrigerating chamber will now be described with reference to the accompanying drawings, in which:

Fig. 1 is a view in side elevation of a typical embodiment of the invention with the casing of the refrigerating chamber broken away to disclose details; and Fig. 2 is an end view of the arrangement of Fig. 1.

A main conveyor 1 and a subsidiary conveyor 2 are located within a refrigerating chamber 3 as shown in Fig. 1. The main conveyor 1 comprises an endless belt of two-ply canvas with a rubber outer surface suitably supported by an arrangement of cross bars and endless chains (not shown). This belt travels over a large drive pulley 4 and a small discharge pulley 5 both of which are substantially hexagonal in cross-section. The drive pulley 4 is a regular hexagon with rounded corners. The discharge pulley 5 is hexagonal with rounded corners and with two opposite parallel and equal long sides and four equal shorter sides. The two pulleys are so located with respect to another that the upper side or flight 6 of the conveyor 1 is horizontal and the return or lower flight 7 moves upwardly at an angle of about 5° to the horizontal.

The operating pulley 4 is provided with a ratchet wheel 8 which is driven intermittently by means of a pawl member 9 carried on an arm 10 rotatable relative to the supporting shaft 11 for the pulley 4. The arm is oscillated relative to the pulley by means of an electro hydraulic motor 12 including a connecting rod 13 for oscillating the arm 10. The motor 12 is controlled by means of a pair of switches 14 and 15, arranged as described hereinafter. The reciprocating movement of the armature 13 is such that the pulley 4 is advanced intermittently in equal steps of 30° each in the direction indicated by the arrows X in Fig. 1, as described in U. S. Patent No. 2,488,344, dated November 15, 1949.

The discharge pulley 5 is located outside the chamber 3 as in Fig. 1 and a stripper bar 16 of stainless angle steel is located near this pulley to engage the ends of the briquettes to aid in dislodging them from the surface of the conveyor 1.

The chamber 3 has a compartment 17 in the corner nearest pulley 5. Two horizontal guides 18 are located in this recess and carry a transversely reciprocated extruding and cutting mechanism 19 like that described in U. S. Patent No. 2,488,344. The mechanism 19 includes a head for extruding a bar of plastic material continuously and also includes a cutting mechanism for cutting the bar into blocks or briquettes. The extruding head is reciprocated on the guides 18 to deposit the briquettes in parallel rows on the conveyor 1 transversely to its direction of movement.

The switches 14 and 15 are arranged at opposite ends of the guides 18. The switches are engaged by the depositing mechanism 19 and are closed alternately as the depositing mechanism 19 reaches the opposite ends of its path. Each switch 14 or 15 closes a circuit to energize the hydraulic motor 12 at the end of each transverse movement of the mechanism 19, so that the conveyor 1 is advanced one step, or a 30° angular movement of the pulley 4, between each transverse movement of the depositing mechanism.

The compartment 17 has an inspection window 20 which opens upwards as in Fig. 1 to allow access to the mechanism 19 and the discharge end of conveyor 1.

The lower conveyor 2 is supported by the circular pulleys 21, 22 and its top and bottom flights travel horizontally through the chamber 1 in opposite directions to the top and bottom flights respectively of the main conveyor 1. The conveyor 2 may be driven by the motor M, for example, by a chain and sprocket drive 23 at the output end of the gear box G, also the distributing mechanism 19 may be driven by means of the motor M and a suitable chain and gear drive D.

The space between the pulley 21 and the end wall of the chamber 3 is sealed by a sheet metal strip 24. The discharge end of conveyor 2 is at pulley 22 and is enclosed in a compartment 25 fitted with a sliding door 26. A number of removable boxes 27 are located end-to-end in this compartment to catch any briquettes which are discharged by conveyor 2. The end-to-end arrangement of boxes 27 is shown in Fig. 2 in which figure the door 26 of compartment 25 is shown fragmentarily. A chute 28 extends from the conveyor 2 down to the bottom of the compartment 25 for delivering pieces of material to the boxes 27.

A narrow conveyor 29 is located on top of the compartment 25 below the discharge end of the conveyor 1, as shown in Figs. 1 and 2. This conveyor travels in the direction of arrow Y in Fig. 2, and conveys the briquettes in single file to a machine for carrying out the subsequent packing and wrapping operations.

The operation of the apparatus is as follows:

Briquettes of ice cream are cut off in rapid succession from a stream extruded through the nozzle of the apparatus 19 and are distributed in the form of parallel rows across the upper side or flight 6 of the conveyor 1 in the manner described in U. S. Patent No. 2,488,344. The bottom surface of each briquette freezes on the upper surface 6 of conveyor 1 as the conveyor moves through the chamber 3 so that by the time a briquette arrives at the pulley 4 it is frozen to the belt surface. Provided that the contact between the bearing surface of a briquette and the belt surface is not broken when the conveyor changes direction, the briquettes will stick to the under-surface of the conveyor as in Fig. 1. Unbroken contact during the change of direction is maintained by the use of the hexagonal pulley 4, which is arranged to move the conveyor 1, intermittently, after each row is deposited. The width of a side c, for example, is sufficient to receive two rows of briquettes (for example a, b in Fig. 1).

The cutting and distributing mechanism 19 is synchronized with the pulley 4 by means of the switches 14 and 15, so that the rows a, b are carried forward by side c of the pulley, and the next rows of briquettes (e, d in Fig. 1) move forward to occupy the positions vacated by rows a, b to overlie the flat side f of the pulley which has moved to the position previously occupied by side c.

If the rate of refrigeration is too slow, a briquette sometimes does not freeze tightly to the conveyor so that it drops off the belt when passing around the pulley 4. These briquettes fall onto the conveyor 2 which conveys them to chute 28 and down into a box 27. Most of the briquettes, however, adhere to the conveyor 1 and are carried along with the conveyor in an inverted position.

The hexagonal pulley 5 is so arranged that each row of briquettes on moving around the lower part of the pulley overlies a corner between sides of the pulley. As a result, at least a part of the surfaces of the briquettes forming each row is broken loose from the belt, as illustrated in Fig. 1, and the reduced area of contact is insufficient to hold the briquettes on the conveyor. The entire row then either drops off the belt onto the conveyor 9 under the action of gravity or by the joint action of gravity and engagement with the stripper bar 16. One such row denoted by the letter g is shown in the act of dropping in Fig. 2.

Being fully frozen by passage through the refrigerating chamber, these briquettes are not appreciably deformed on falling. The speed of conveyor 29 is adjusted so that by the time one row of briquettes (h in Fig. 2) has moved from in front of conveyor 1, the next row of briquettes (g in Fig. 2) falls onto the conveyor 29. Thus the briquettes are conveyed in single file by conveyor 29 to machines for performing the wrapping and/or packing operations.

Any briquettes which have fallen from conveyor 1 onto conveyor 2 are added to the line of briquettes on conveyor 29 by removing them from the boxes 27 and placing the briquettes on the conveyor 29 by hand. Alternatively, if some of the briquettes in the boxes 27 are distorted because they have fallen onto conveyor 2 before being hardened sufficiently, they can be rejected.

If desired, any ice cream remaining on the belt can be removed by brushing the belt surface after a row has dropped and prior to the addition of a new row.

From the preceding description of a typical embodiment of the invention, it will be apparent that I have provided a refrigerating system and a conveyor therefor which has a relatively high refrigerating capacity which permits a high production rate in a relatively small area. Moreover, the refrigerating system to a large degree avoids deformation of the pieces of plastic material or briquettes and also reduces handling of the product prior to packaging to a minimum.

It will be understood that the system and method are susceptible to considerable modification in size and structural details, and, therefore, the embodiment of the invention described herein should be considered as illustrative and not as limiting the scope of the following claims.

I claim:

1. A method of hardening pieces of plastic material comprising depositing pieces of congealable plastic material on an endless conveyor belt having substantially straight upper and lower flights and end flights connecting said upper and lower flights and moving said conveyor belt in a refrigerating zone enclosing one end flight and at least a substantial length of each of the upper and lower flights advancing said pieces through said zone, freezing and bonding said pieces to said belt while moving along said upper flight, maintaining unbroken surface contact between said pieces and said belt during their movement from said upper to said lower flight along one of said end flights and during their movement along that part of said lower flight enclosed by the refrigerating zone to prevent separation of said pieces from said belt and removing the pieces from the conveyor belt after they have been conveyed by it over at least the major portion of the lower flight.

2. An apparatus for refrigerating congealable plastic material comprising a refrigerating chamber, a pair of substantially horizontally spaced pulleys in said chamber, an endless flexible belt extending around and supported by said pulleys to form upper and lower flights, means for depositing pieces of congealable plastic material on the outer surface of said upper flight at one end thereof adjacent to one of said pulleys, the other of said pulleys having a plurality of flat sides to support successive portions of said belt in a flat condition, means for moving said belt in said chamber in timed relation to said depositing means to receive said pieces on portions of said belt which subsequently will overlie said flat sides to maintain unbroken surface contact between said belt surface and said pieces, and means adjacent said one of said pulleys for removing the pieces from the lower flight of the belt.

3. The apparatus set forth in claim 2 in which said belt comprises canvas having a rubbery surface.

4. The apparatus set forth in claim 2 in which said belt consists of plastic coated fabric.

5. A refrigerating apparatus for congealable plastic material comprising a refrigerating chamber, a first pulley rotatably mounted outside said chamber, a second pulley having a plurality of substantially flat sides within said chamber and spaced substantially horizontally from the said first pulley, an endless flexible belt extending around and supported by said pulleys, a depositor above said belt adjacent to said first pulley for depositing pieces of congealable plastic material successively on said belt, means for moving said belt in timed relation to said depositor to receive therefrom said pieces of material at zones which subsequently will overlie the flat sides of said second pulley, to maintain unbroken surface contact between said belt and said pieces to avoid separation of the pieces from said belt as the latter passes over said second pulley, said first pulley being formed to flex said belt relative to said pieces to break the surface contact between the belt and pieces and dislodge the latter from said belt.

6. The apparatus set forth in claim 5 including means for moving said depositor transversely of said belt to deposit said pieces in rows transversely of said belt, and in which said means for moving said belt, moves the latter intermittently.

7. The apparatus set forth in claim 5 including a second endless belt below the first-mentioned belt to receive pieces of material accidentally separated from said first-mentioned belt.

8. A method of hardening discrete pieces of congealable plastic material, which comprises depositing said pieces on the flat outer surface of an endless conveyor belt, the return path of which lies under its forward path with at least a major portion of the lengths of both paths being enclosed by a refrigerating zone, moving said conveyor in said zone, freezing and bonding said pieces to the outer surface of the conveyor, maintaining unbroken surface contact between said pieces and said surface during their movement along substantially the whole length of the forward and of the return paths and during their change of direction from the forward to the return path and discharging the pieces from the belt by bending the belt relative to the pieces at the areas in contact with the pieces while moving from the return to the forward path, so as to break the bond between the pieces and the belt surface.

9. A method as claimed in claim 8, in which the surface of the conveyor belt at the areas in contact with the pieces is maintained flat, while changing direction from the forward to the return path.

10. An apparatus for refrigerating congealable plastic material comprising a refrigerating chamber, a pair of substantially horizontally spaced pulleys in said chamber, an endless flexible belt extending around and supported by said pulleys to form upper and lower flights, means for depositing pieces of congealable plastic material on the outer surface of said upper flight at one end thereof adjacent to one of said pulleys, the other of said pulleys being polygonal in cross section and having a plurality of equiangularly related flat sides to support successive portions of said belt in a flat condition, means for moving the belt, and means for synchronizing the belt moving means with the depositing means to move the belt to a position to receive a piece from the depositor on a portion of the belt which subsequently will overlie one of said flat sides, said one pulley being of different external dimensions than said other pulley to bend the belt beneath the pieces and separate them from said belt.

11. A refrigerating apparatus for congealable plastic material comprising a refrigerating chamber, a rotatably mounted discharge pulley having a plurality of substantially flat sides, a second pulley having a plurality of substantially flat sides within said chamber and spaced substantially horizontally from the discharge pulley, an endless flexible belt extending around and supported by said pulleys, a depositor above said belt adjacent to the discharge pulley for depositing pieces of congealable plastic material successively on said belt, means for moving the belt, and means for synchronizing the belt moving means with the depositor to move the belt to a position to receive a piece from the depositor on a portion of the belt which subsequently will overlie one of the flat sides of the second pulley, said discharge pulley being of such dimensions and so spaced from the second pulley that the pieces will subsequently overlie corners between the sides of the said discharge pulley.

12. A refrigerating apparatus for congealable plastic material comprising a refrigerating chamber, a discharge pulley rotatably mounted and having a plurality of substantially flat sides, a second pulley having a plurality of substantially flat sides within said chamber, and spaced substantially horizontally from the discharge pulley, an endless flexible belt extending around and supported by said pulleys, a depositor above said belt adjacent to the discharge pulley for depositing pieces of congealable plastic material successively on said belt, means for moving said depositor transversely of said belt to deposit said pieces in rows transversely to said belt, means for moving the belt, and means comprising switches actuated by movement of said depositor to the limits of its transverse movement for synchronizing the belt moving means with the depositor to move the belt to a position to receive a piece from the depositor on a portion of the belt which subsequently will overlie one of the flat sides of the second pulley, said discharge pulley being of such dimensions and so spaced from the second pulley that the pieces will subsequently overlie corners between the sides of the said discharge pulley.

References Cited in the file of this patent

UNITED STATES PATENTS

| Number | Name | Date |
| --- | --- | --- |
| 1,817,890 | Birdseye | Aug. 4, 1931 |
| 2,223,972 | Sterling | Dec. 3, 1940 |
| 2,247,865 | Zarotschenzeff | July 1, 1941 |
| 2,267,789 | Conn | Dec. 30, 1941 |
| 2,372,373 | Gilson | Mar. 27, 1945 |
| 2,487,408 | Askin | Nov. 8, 1949 |
| 2,488,344 | Stonestreet et al. | Nov. 15, 1949 |